FIP8102 OR 3,851,250

United States [11] 3,851,250
Fletcher et al. [45] Nov. 26, 1974

[54] REMOTE PLATFORM POWER CONSERVING SYSTEM

[76] Inventors: James C. Fletcher, Administrator of the National Aeronautics and Space Administration with respect to an invention of; Charles W. Kurvin, Beiserstr. 10, Ottobrunn, Germany

[22] Filed: Aug. 31, 1973

[21] Appl. No.: 393,527

[52] U.S. Cl. .................................................. 325/4
[51] Int. Cl. .............................................. H04b 7/14
[58] Field of Search ............ 325/4, 115; 179/15 AS, 179/15 BS; 244/1 SS

[56] References Cited

UNITED STATES PATENTS 3,192,476 6/1965 Nuffer et al. .......................... 325/4
R26,680 10/1969 Rosen .................................. 325/4

OTHER PUBLICATIONS

IBM Technical Disclosure Bulletin on "Ranging for Multiple Access Satellite Communications System" by Blasbalg et al., Vol. 10 No. 7 12/67.

*Primary Examiner*—Benedict V. Safourek
*Assistant Examiner*—Jin F. Ng
*Attorney, Agent, or Firm*—Robert F. Kempf; John R. Manning

[57] ABSTRACT

In a system where an unattended receiver and transmitter equipped data collection platform is interrogated by a substantially polar orbiting satellite, method and apparatus which involve physically representing the orbit of the satellite and the spin of the planetary body with timers and using these representations to turn on the platform's receiver only when the satellite should be in radio range of the platform whereby battery power at the platform is conserved.

9 Claims, 9 Drawing Figures

SPIN TIMER

ORBIT TIMER

REMOTE PLATFORM POWER CONSERVING SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

The invention relates to the deployment of remote instrumented platforms on or above the surface of a planetary body, in particular the earth, and to the recovery of data from these platforms using an orbiting satellite. Data was first collected from remote unattended platforms on or near the surface of the earth using the Nimbus 3 satellite, launched April 1969. That satellite had a substantially polar orbit and carried an Interrogation, Recording and Location System (IRLS). A second improved system was launched in April 1970 aboard Nimbus 4.

Instrumented platforms may be attached to meteorological balloons, sea buoys, animals, in the case of earth platforms, or may be placed at a fixed site on a planetary body.

Particularly in the case of platforms attached to animals for study of their migration habits, there are severe design limitations. Size and weight available for battery power is critical and the solar irradiance that would be received by solar cells is completely indeterminable. The need exists for a technique of communicating with an orbiting satellite which would conserve platform battery power so that a small battery could be used.

It is an object of the invention to fill that need. In particular, it is an object of the invention to provide a method of establishing communication between a receiver and transmitter equipped platform located on a spinning planetary body and a substantially polar orbiting satellite which conserves the platform's power source.

It is a further object to provide a lightweight data collection device adapted to be interrogated by a substantially polar orbiting satellite.

SUMMARY OF THE INVENTION

These objects are satisfied by incorporating on the platform a first timer for generating time windows substantially synchronized in time with the orbit of the satellite and a second timer for generating time windows substantially synchronized in time with the spin of the planetary body. A first signal is generated at a time which is within both generator's time windows and is used to turn on the platform's receiver. At this point, communication from the satellite to the platform is enabled. The satellite then transmits an interrogation command to which the platform responds by briefly turning on its transmitter and transmitting data. The data transmitted from the platform may include the time of the leading edge of the orbit synchronized time window. The leading edge of subsequent orbit synchronized time windows may then be time shifted by satellite command.

After a period of time sufficient for communication, the platform's receiver is turned off thereby conserving battery power.

Other objects and features of this invention will become apparent after the following detailed description taken in conjunction with the appended drawings wherein:

FIG. 1 illustrates the platform-satellite geometry at a first instant of time when they are within radio range of each other. It shows a spinning planetary body, with its spin axis vertically oriented, and an illustrative location of the platform on the planetary body. Also shown is the location of the satellite at this first instant of time and the path of its substantially polar orbit.

FIGS. 2A and 2B show a top view of the planetary body and orbital path of FIG. 1. FIG. 2A shows the location of the satellite and platform at the same instant of time as FIG. 1 while FIG. 2B shows their location at a second instant of time when the satellite and platform are within radio range.

FIG. 3 schematically shows the platform hardware of the invention and includes an orbit timer and a spin timer for generating the time windows bracketing the instants of time shown by the preceeding figures.

DETAILED DESCRIPTION

Figures 1, 2A, 2B:
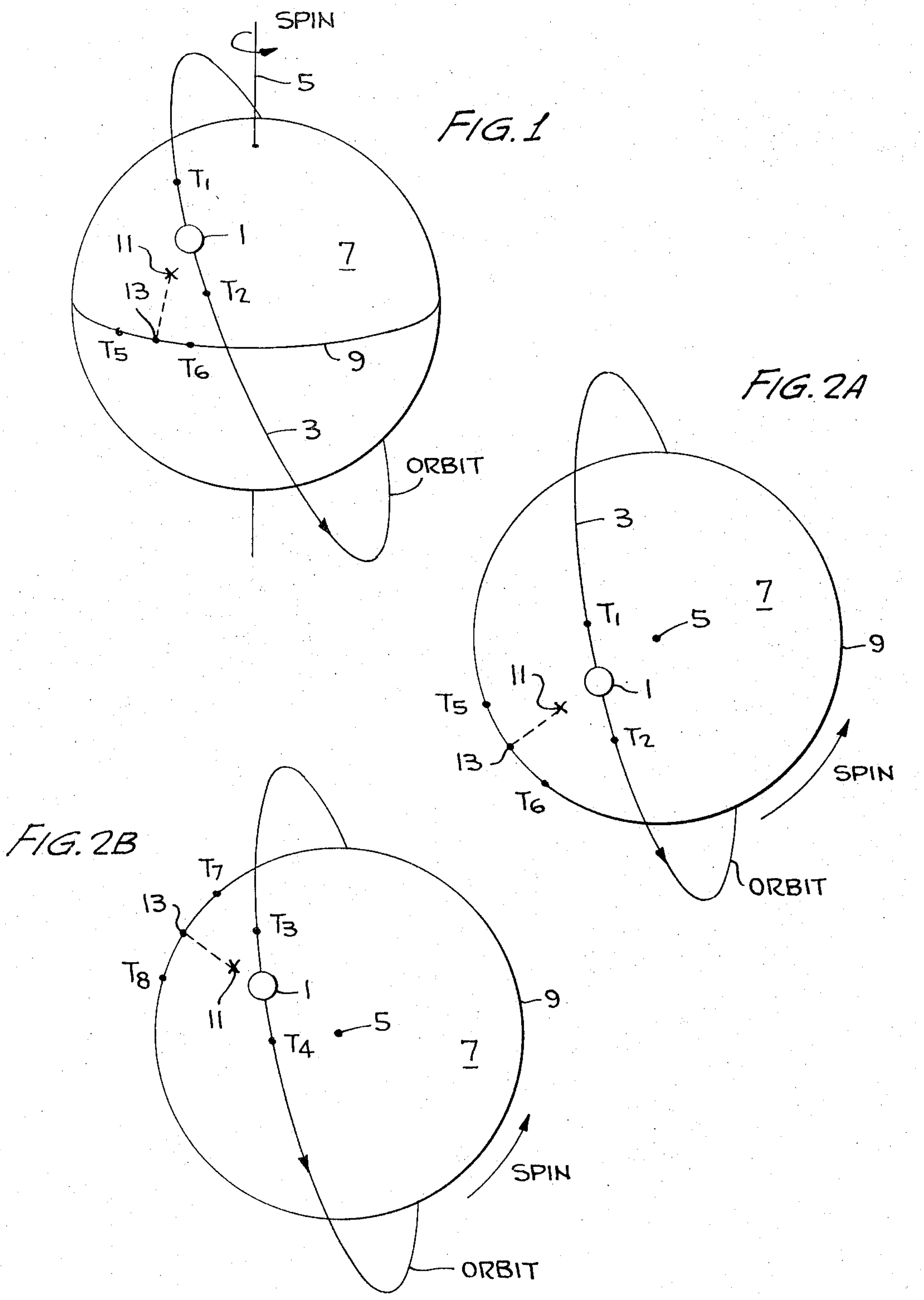

FIG. 1 illustrates the platform-satellite geometry at a first instant of time when they are in radio range. The satellite 1 is shown at a location along its orbital path 3. The spin axis 5 of the planetary body 7, for example the earth, is also shown. As an illustrative example, the orbit may be at an altitude of 1,100 kilometers and contained in a plane which is inclined from the spin axis by 9°. Such an orbital path falls into the class of polar sunsynchronous orbits. The particular one described, has an orbital period of 107 minutes. Thus also considering the earth rotation about its spin axis 5, the satellite will make successive crossings of the equator 9 which are 27° of longitude apart. This will provide local noon and midnight equator crossings at the ascending and descending nodes. Thus any position on the earth will be in radio range of the satellite two times a day. At the equator these two times will be approximately 12 hours apart while at other latitudes, this will not be true as will be soon apparent.

In FIG. 1, an illustrative location of platform 11, is shown. This location is shown to be at a north latitude. The longitude 13 of the platform 11 is shown projected on the equator 9.

Bracketing the location of the satellite at this first instant of time are locations and times T1 and T2 which are in an inertial frame of reference. These are locations at which the satellite 1 would be in radio range of the platform 11 if the earth were in the position shown. These locations can be expressed as defining time windows which repeat each orbit (every 107 minutes).

The spin of the earth can be viewed in the same manner. The locations and times T5 and T6 are in an inertial (nonspining) frame of reference and bracket the longitudinal projection 13 of the platform location 11. These can be viewed as time windows which repeat in a spin period (24 hours).

The particular first instant of time shown shall be considered a day intersection of the satellite and platform. Since each day there are two intersections, or times when the platform and satellite are within radio range of each other, a second intersection exists. This shall be called the night intersection.

FIG. 2A shows the day intersection of FIG. 1. This is a top view of FIG. 1, so the spin axis 5 appears as a point.

In FIG. 2B is shown the night intersection of the satellite 1 and the platform location 11. This intersection is behind the earth in FIG. 1 and can't be seen. In a similar manner the times T3 and T4 bracket the satellite location while the times T7 and T8 bracket the location of the longitudinal projection 13 of the platform location. Note that the times T5 and T7 are not 12 hours (180°) apart.

According to the invention an intersection is found by comparing the outputs of a spin timer and an orbit timer. If the orbit timer is between T1 and T2 and the spin timer is between T5 and T6 there is a day intersection. If the spin timer is between T7 and T8 and the orbit timer is between T3 and T4 there is a night intersection. When an intersection occurs, the platform's receiver is turned on to enable communication with the satellite.

The times T1 through T8 can be determined when there is knowledge of the location on the earth where a platform is to be deployed by well known techniques of computer simulation. This involves programming the equations of motion of the satellite and platform and computing their distance from each other. Once these times are known they may be built into the hardware next to be described with the understanding that it is desirable to be able to initialize the orbit and spin timers upon deployment of the platform. Therefore it is really T2–T1, T4–T3 and T3–T1 which are built into the orbital timer and likewise for the spin timer. This point won't be further touched on because it complicates an understanding of the invention. It has been found that optimally for the particular example orbit described, that T2–T1 and T3–T1 should be ten minutes on the orbit timer, while T4–T3 and T8–T7 should be 84 minutes on the spin timer. Thus the spin timer provides a window (84 minutes) which effectively selects a portion of a particular orbit and the orbit timer determines when an intersection occurs in the selected orbit.

Figure 3:
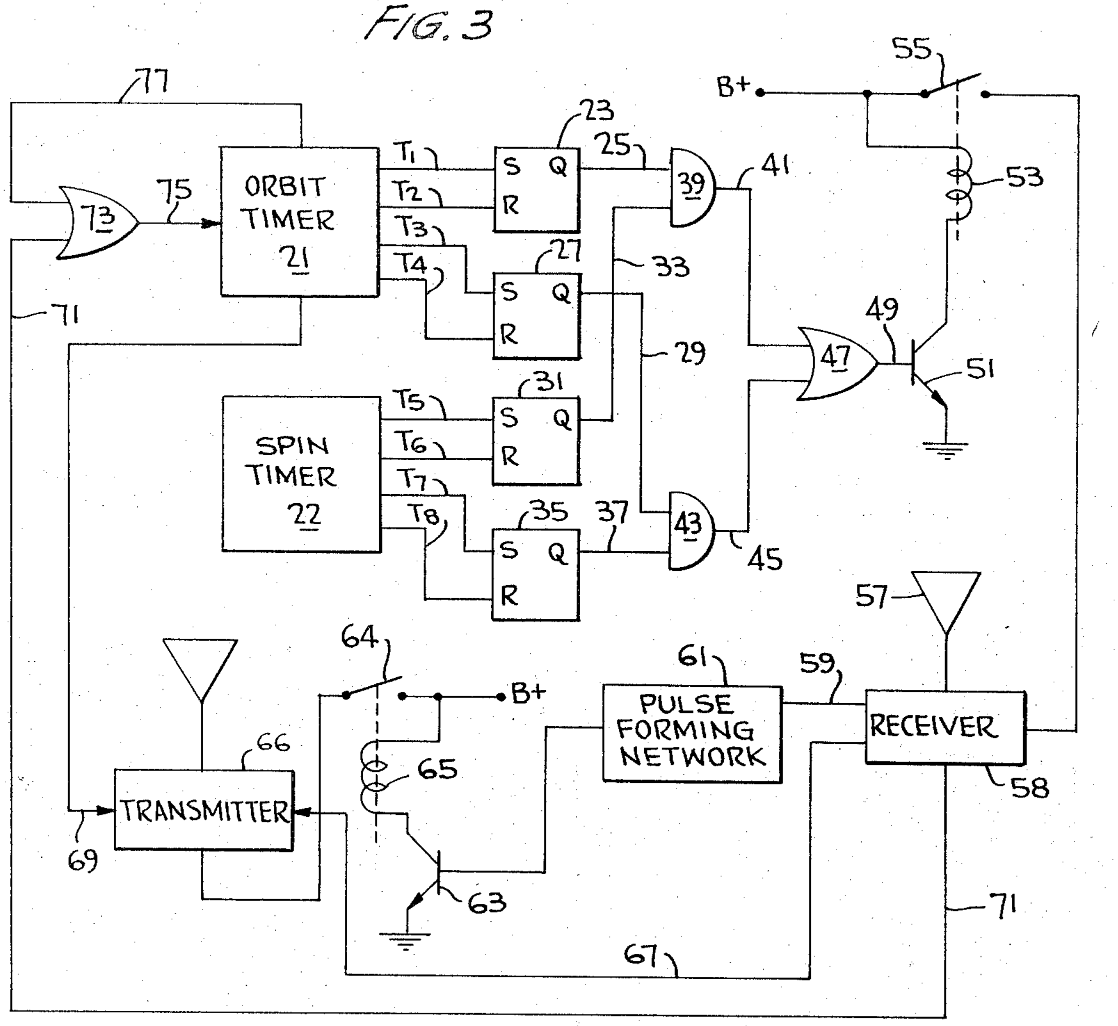

FIG. 3 shows schematically the platform hardware for carrying out the invention. The orbit timer 21 produces outputs at times T1 through T4. Time T1 is the start or leading edge of the orbit day intersection window while T2 is the end or trailing edge of that window. Similarly T3 and T4 respectively define the orbit night intersection window. At the times T1 through T4 a change of logic level occurs or the indicated one of the four lines outputted by the orbit timer 21. At time T1, flip-flop 23 will be set and afterwards at time T2, flip-flop 23 will be reset thereby causing a pulse, of 10 minute duration, to appear on the flip-flop output 25 whose leading and trailing edge define the orbit day intersection time window. Similarly T3 sets flip-flop 27 and T4 resets it which causes a pulse, of 10 minute duration, at its output 29 defining an orbit night intersection time window. In a similar manner spin day and night intersection time window pulses of 84 minute duration appear at flip-flop outputs 33 and 37 respectively due to outputs T5 through T8 of spin timer 22. The orbit and spin day intersection time window pulses appearing at 25 and 33 are next fed to "and" gate 39 such that its output 41 will have a pulse (of 10 minutes or less duration) only during the time that both day time window pulses are present. Similarly orbit and spin night intersection time window pulses are fed to "and" gate 43 having an output 45. The pulses appearing at 41 and 45 thus define actual intersections which are picked out of the frequent orbit time windows occurring every 107 minutes. The lines 41 and 45 are fed to OR gate 47 so that its output 49 has a pulse for either a day or night intersection. It is this line which enables communication with the satellite by turning on the normally off platform receiver. The transistor 51 is turned on which causes relay 53 to be energized. This in turn closes contact 55 supplying battery power to the receiver 58. The receiver may then receive with its antenna 57 a satellite interrogation command which is decoded on line 59. Upon decoding an interrogation command a pulse is then generated by the pulse forming networks 61 to briefly turn on transistor 63 which by briefly energizing relay 65 causes battery power to be briefly applied to the transmitter 66, via contact 64.

The transmitted data may include the received signal, line 67, the state of the orbit timer, line 69, and other data collected by the platform, (not shown). By retransmitting the received signal the exact location of the platform can be pinpointed by well known ranging techniques. This is explained in an article entitled The Nimbus 4/IRLS Meteorological Experiment by Charles E. Cote in the 1971 National Telemetry Conference Record at page 203. The state of the orbital timer or the actual time of the start of the orbit timer window may be transmitted so that a correcting signal may be sent from the satellite to correct for drift of the orbit timer. On line 71 is shown a decoded correcting signal which via "or" gate 73 causes the orbit timer to speed up, for example, for a short period of time in order to adjust the time of occurrence of subsequent orbit timer windows. Although it is shown that only the orbital timer is remotely adjusted since its accuracy is more critical than that of the spin timer, it should be understood that similar means may also be provided to adjust the spin timer.

On line 77 is a feedback path which is meant to illustrate schematically that the speed-up mechanism can be used as well to aid in the synthesis of the required orbit timer period. This will be further explained later.

After the intersection has ended, the logic level at the output of "or" gate 47 (line 49) will return to its normally zero level. This causes transistor 51 to be turned off thereby deenergizing relay 53. By the opening of relay contact 55, battery power will be removed from the receiver 58.

Although level type logic has been shown for ease of understanding the invention, it is to be understood that pulse type logic may also be used. For example relays 53 and 65 could be latching relays to which pulses are applied to either latch or unlatch the relays. In either approach there are identifiable means, including the timers, for generating orbit synchronized and spin synchronized time windows.

Figure 4A:
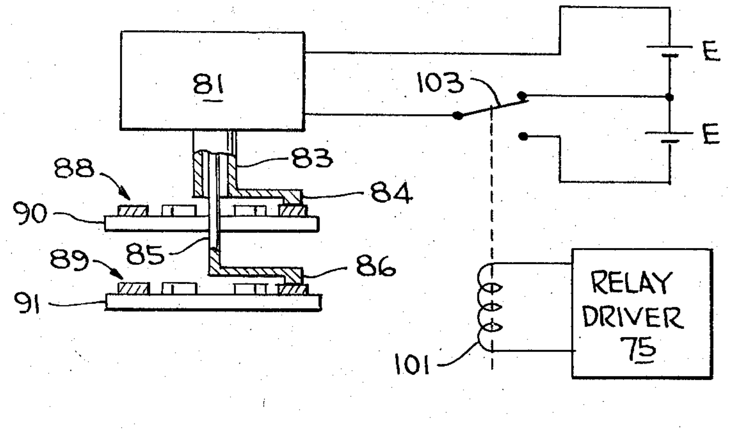
FIG. 4A shows an embodiment of the timers wherein voltage driven watch movements incorporate hour and minute wiper arms associated with contact pads.

FIG. 4A shows an embodiment of the orbit or spin timers using an electrically driven watch movement having wiper arms associated with contact pads.

Shown there is an electrically driven watch movement 81 preferably of the type which incorporates a tuning fork resonator. Two rotating shafts emanate from the watch movement, an hour shaft 83 and a minute shaft 85. As in conventional watches, shaft 83 may make one revolution per 12 hours while shaft 85 may make one revolution per 60 minutes. Instead of having hands moving with respect to a dial, these shafts have wiper arms 84 and 86 for making electrical contact with an annular array of contact pads 88 and 89. The contact pads arrays may be formed by selectively etching conductor clad insulating boards as is well known. Thus board 90 has the hour contacts while board 91 has the minute contacts.

Figure 4B:
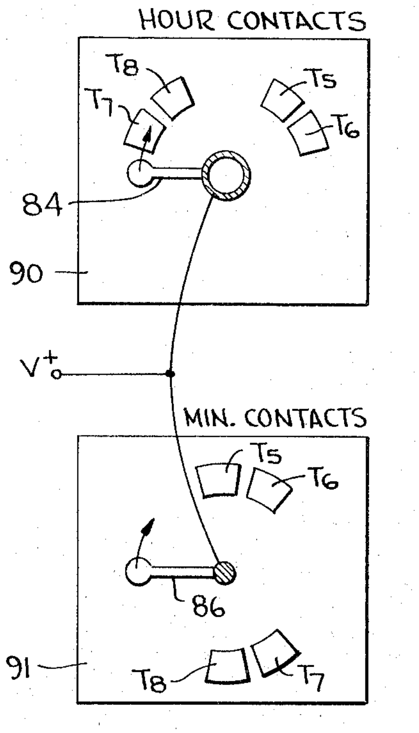
FIG. 4B shows the configuration of the contact pads associated with the hour and minute wipers for the spin timer.
Figure 4C:
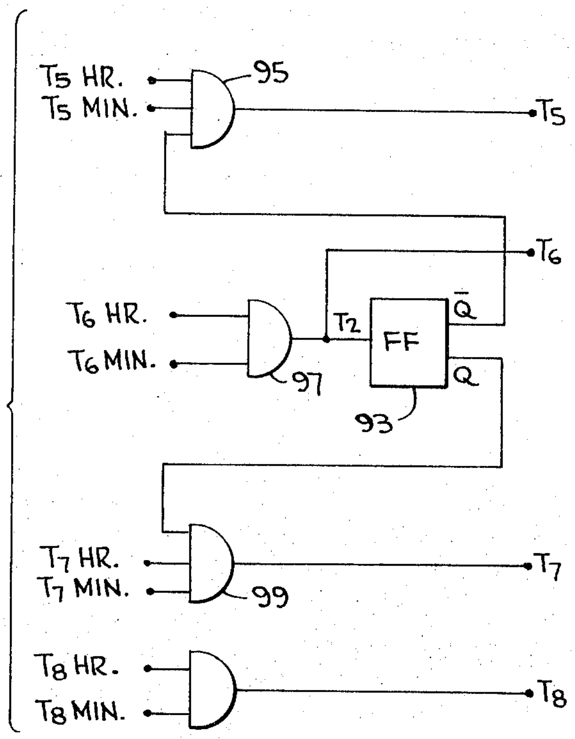
FIG. 4C shows schematically the circuitry for generating spin time windows.

The configuration of the spin timer contact pads and of the circuitry connected thereto is shown in FIGS. 4B and 4C. Times T5 through T8 can be decoded by "anding" contacts on the hour contact array with those on the minute contact array. The hour and minute wiper arms have voltage applied to them so that a logical 1 appears on a wire attached to a contact when the wiper touches that contact. The hour contact board 90 has contacts T5 through T8. Since the wiper arm 84 makes one revolution in 12 hours, alternate windows T5, T6 and T7, T8 are used on each revolution in order to get a 24 hour spin timer period. That is, the hour wiper arm makes two revolutions per spin period. Looking also at FIGS. 2A and 2B it is clear that the time from T5 to T7 is less than 12 hours while the time from T7 to T5 is more than 12 hours.

Toggle flip flop 93's outputs Q and $\overline{Q}$ enable an indication of either T5 or T7 via gates 95 or 97 respectively. Assuming that the flip flop 93 has been initialized so that $\overline{Q}$ is a logical 1 (enabling T5 and disabling T6), when the hour wiper 84 and minute wiper 86 contact T5 hours and minutes, the output of "and" gate 95 will be a logical 1 indicating time T5. Next, 84 minutes later, time T6 will be indicated at the output of "and" gate 97. The toggle flip-flop has the property that a change from logical 0 to logical 1 at its input T terminal will reverse the state of its outputs Q and $\overline{Q}$. Thus $\overline{Q}$ will then be logical O while Q will be logical 1 (enabling T7 and disabling T5). This will allow "and" gate 99 to indicate T7 less than 12 hours later when the T7 minute and hour contacts are reached by their respective wipers. 84 minutes later, T8 will be indicated. Less than 12 hours later when the T5 hour and minutes contacts are reached by their respective wipers there will be no output from "and" gate 95 because $\overline{Q}$ is logical 0. Then when T6 is reached the toggle flip flop 93 will change state. $\overline{Q}$ will then be logical 1 while Q will be logical zero. This 0 state of Q will disable an indication of T7 less than 12 hours later. The first indication will be T5 which starts the process over again. Thus, T7 was indicated less than 12 hours after T5 and subsequently T5 was indicated more than 12 hours after T7 and 24 hours after the first T5 indication.

Figure 4D:
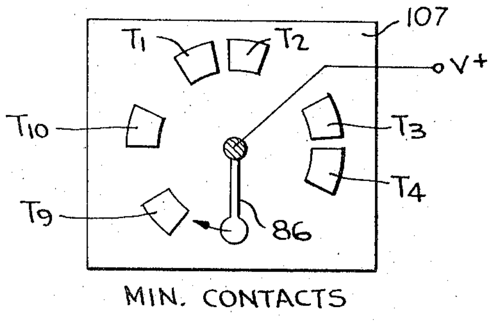
FIG. 4D shows the configuration of the contact pad associated with the minute wiper of the orbit timer.
Figure 4E:
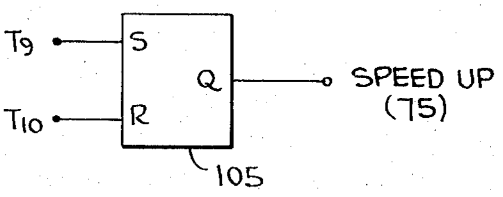
FIG. 4E shows schematically the circuitry for generating orbit time windows.

The orbit timer contact pad and associated circuitry, shown in FIGS. 4D and 4E respectively, operate in a somewhat different manner to the spin timer circuitry. Note first that only the minute contacts are used. The orbital period is, for example, 107 minutes and it is desirable for the minute wiper arm to make one revolution per orbital period. Referring now to FIG. 4A, it is noted that it shows a mechanism for changing the speed at which the watch movement 81 runs. Shown there is a control line 75 which operates a relay 101. The relay's single-pole double-throw contacts 103 causes either one battery or two batteries in series to supply power to the watch movement 81. The voltage of one battery runs the movement at its normal rate, while the increased voltage of two batteries in series will cause the watch movement to run faster. It has been found that a doubling of voltage will cause the speed of a typical tuning fork watch movement to triple. This speed up mechanism can be used to adjust the time of future windows by satellite command as previously indicated. The speed-up mechanism can also be used to cause the "minute" wiper arm to make one rotation per orbital period. This is accomplished by providing minute contacts T9 and T10 on the orbit timer shown in FIG. 4D. T9 sets flip flop 105 while T10 resets it. This produces a pulse at flip flop output 75 which is logical 1 for the period of time between T9 and T10. This logical 1 causes the movement to speed up. For the example of a 107 minute orbital period, if T9 and T10 are 23.5 minutes apart on the dial and the wiper arm 86 will move at triple speed between the contacts the required $107 - 60 = 47$ minutes will be made up.

Since now this timer makes one revolution per orbital period, the times T1 through T4 may be picked off from the contacts directly. Thus T1 and T2 are preferably separated by 10 minutes as are T3 and T4. The contacts T1–T4 are placed on the minute contact board 91 in accordance with a knowledge of the day and night intersections for the expected location of platform deployment.

Having described the invention in detail, it should be clear that the aforementioned objects have been satisfied. Accordingly, since alternate but equivalent techniques of implementation are considered within the scope of the invention, the following claims define the invention.

What is claimed is:

1. A lightweight remote data collection device confined to a region on a spinning planetary body and adapted to be interrogated by a substantially polar orbiting satellite comprising:

a. a receiver for receiving commands from the satellite;

b. a transmitter for transmitting the data to the satellite;

c. orbit timer means for generating first time windows substantially synchronized in time with the orbit of the satellite;

d. spin timer means for generating second time windows substantially synchronized in time with the spin of the planetary body;

e. means for generating a first signal at a time which is within both first and second time windows; and f. means for turning on the receiver in response to the first signal.

2. The device of claim 1 which additionally comprises means for turning on the transmitter in response to an interrogation command received from the satellite.

3. The device of claim 2 wherein the transmitted data includes the state of the orbit timer means and which additionally comprises means for generating a third signal in response to a received satellite command and means for altering the state of the orbit timer means in response to the third signal.

4. The device of claim 2 additionally comprising means for turning off the receiver at a time which is not within both first and second time windows.

5. The device of claim 3 where both the orbit timer means and spin timer means are voltage driven watch movements comprising a first contact driven through an arc by an applied voltage, a plurality of further contacts positioned along said arc for engagement with said first contact.

6. The device of claim 5 where the means for altering the state of the orbit timer includes means for changing said voltage applied to said voltage driven driving the watch movement.

7. A method of establishing communication between a receiver and transmitter equipped platform located on a spinning planetary body and a substantially polar orbiting satellite comprising:

a. generating first signals having leading and trailing edges which occur in time substantially synchronous with the orbit of the satellite and which define first time windows;

b. generating second signals having leading and trailing edges which occur in time substantially synchronous with the spin of the planetary body and which define second time windows; and c. turning on the platform's receiver at a time which is within both first and second time windows as defined by said first and second signals.

8. The method of claim 7 additionally comprising:

a. transmitting a first command from the satellite; and b. turning on the platform's transmitter in response to said first command.

9. The method of claim 8 additionally comprising:

a. transmitting from the platform a signal indicative of the time of the leading edge of the first signal;

b. transmitting from the satellite a second command; and c. adjusting the time of the leading edge of subsequent first signals in response to said second command.

* * * * *